(12) United States Patent
Butler et al.

(10) Patent No.: US 9,612,400 B2
(45) Date of Patent: Apr. 4, 2017

(54) MULTI-CORE OPTICAL FIBER

(71) Applicants: Douglas Llewellyn Butler, Painted Post, NY (US); Andreas Matiss, Berlin (DE); Eric Stephan ten Have, Berlin (DE)

(72) Inventors: Douglas Llewellyn Butler, Painted Post, NY (US); Andreas Matiss, Berlin (DE); Eric Stephan ten Have, Berlin (DE)

(73) Assignee: CCS TECHNOLOGY, INC., Wilmington, DE (US)

( * ) Notice: Subject to any disclaimer, the term of this patent is extended or adjusted under 35 U.S.C. 154(b) by 0 days.

(21) Appl. No.: 15/099,682

(22) Filed: Apr. 15, 2016

(65) Prior Publication Data

US 2016/0231508 A1 Aug. 11, 2016

Related U.S. Application Data

(63) Continuation of application No. PCT/US2014/061337, filed on Oct. 20, 2014.

(30) Foreign Application Priority Data

Oct. 22, 2013 (EP) .................................... 13189752

(51) Int. Cl.
*G02B 6/12* (2006.01)
*G02B 6/34* (2006.01)
(Continued)

(52) U.S. Cl.
CPC ........... *G02B 6/30* (2013.01); *G02B 6/02042* (2013.01); *G02B 6/12004* (2013.01); *G02B 6/34* (2013.01);
(Continued)

(58) Field of Classification Search
CPC ...... G02B 6/30; G02B 6/4214; G02B 6/4249; G02B 6/43; G02B 6/02042; G02B 6/262; G02B 6/12004; G02B 6/34
(Continued)

(56) References Cited

U.S. PATENT DOCUMENTS 6,246,026 B1 6/2001 Vergeest
6,257,769 B1 * 7/2001 Watanabe ................ G02B 6/30
385/49

(Continued)

FOREIGN PATENT DOCUMENTS

CN 101236275 A 8/2008
JP 2001229132 A 8/2001

OTHER PUBLICATIONS

Patent Cooperation Treaty, International Search Report for PCT/US2014/061337, mail date Apr. 30, 2015, 3 pages.

*Primary Examiner* — Akm Enayet Ullah

(57) ABSTRACT

A multi-core optical fiber (100) comprises a plurality of optical cores (1, . . . , 8) to respectively transmit light and a plurality of cleaves (110*a*, 100*b*, 110*c*, 110*d*, 110*e*, 110*f*, 110*g*, 110*h*) extending from a surface (102) of the multi-core optical fiber (100) into the multi-core optical fiber. A first cleave (110*a*) comprises a surface (111*a*) to couple light out of the optical fiber, wherein a first optical core (1) ends at the surface (111*a*) of the first cleave (110*a*). An at least one second cleave (110*b*, . . . , 110*h*) comprises a surface (111*b*, . . . , 111*h*) to couple light out of the optical fiber, wherein at least one second optical core (2, . . . , 8) ends at the surface (111*b*, . . . , 111*h*) of the at least one second cleave (110*b*, . . . , 110*h*). The first and the at least one second cleave (110*a*, . . . , 110*h*) are staggered along the longitudinal axis (101) of the multi-core optical fiber (100).

23 Claims, 10 Drawing Sheets

(51) Int. Cl.
   *G02B 6/26*    (2006.01)
   *G02B 6/30*    (2006.01)
   *G02B 6/02*    (2006.01)
   G02B 6/42      (2006.01)
   G02B 6/43      (2006.01)

(52) U.S. Cl.
   CPC ............ *G02B 6/262* (2013.01); *G02B 6/4214* (2013.01); *G02B 6/4249* (2013.01); *G02B 6/43* (2013.01)

(58) Field of Classification Search
   USPC ..................................................... 385/14, 24
   See application file for complete search history.

(56) References Cited

U.S. PATENT DOCUMENTS

| | | | |
|---|---|---|---|
| 7,162,124 B1 | 1/2007 | Gunn, III et al. | |
| 8,737,845 B2* | 5/2014 | Fiorentino | ........... G02B 6/4204 385/37 |
| 9,122,037 B2* | 9/2015 | Shastri | .................... B32B 37/16 |
| 2011/0129231 A1* | 6/2011 | Fiorentino | ........... G02B 6/4204 398/141 |
| 2011/0274438 A1* | 11/2011 | Fiorentino | ............... G02B 6/34 398/141 |
| 2012/0099112 A1 | 4/2012 | Alphonse et al. | |
| 2013/0088771 A1* | 4/2013 | Li | .......................... H01S 3/067 359/341.3 |
| 2014/0042478 A1* | 2/2014 | Hirono | ................... H01L 33/54 257/98 |

* cited by examiner

MULTI-CORE OPTICAL FIBER

PRIORITY APPLICATION

This application is a continuation of International Application No. PCT/US14/61337, filed on Oct. 20, 2014, which claims the benefit of priority under 35 U.S.C. §119 of European Patent Application Serial No. 13189752.2, filed on Oct. 22, 2013, the content of which is relied upon and incorporated herein by reference in its entirety.

FIELD

The disclosure is directed to a multi-core optical fiber which may be coupled to an optical chip. The disclosure is further directed to an optical system in which a multi-core optical fiber is coupled to an optical chip. The disclosure also relates to a method of manufacturing a multi-core optical fiber.

BACKGROUND

In optoelectronic applications optical links have to be provided to connect different optical components of an optical device or to connect different optical devices with each other. Multi-core optical fibers allow for high density optical links that can be used inside optical devices to connect different optical components or between different optical devices. However, the density of the fiber cores makes the connection to an optical device difficult. When connecting two optical components like VCSELS or photodiodes the size of the optical component dictates the spacing of the separate connections. Typical component sizes are on the order of 200 µm, while the distance between the optical cores inside an optical fiber is generally lower than 100 µm. This means that multi-core optical fibers cannot be used to connect these optical components without modification of the multi-core optical fiber or application of an intermediate step using additional optical components.

It is believed that in the future a plurality of optical devices will be manufactured by the Silicon Photonics technology. As used herein, "Silicon Photonics" means using a chip such as an integrated circuit (IC) having the ability for receiving optical signal along with the electronic functionality in the chip, for example a chip with silicon or III/V-materials. The advantages of Silicon Photonics are reduced space and power requirements concurrent with increased speed and lower costs. These photonic structures on an optical chip still have to be connected to the outer devices through optical waveguides such as optical fibers. However, using separate fibers, for example with a diameter of about 125 µm, for each connection requires much more space than the counterpart silicon photonic structures which have, for example, a diameter of about 200 nm, and thus partly cancels the effect of miniaturization.

The application of a multi-core optical fiber for coupling to an optical chip including optical devices made by the Silicon Photonics technology can help to conserve the high density packing of the photonic structures by increasing the connection density, for example by arranging eight optical cores in the diameter of an ordinary optical fiber. Since the Silicon Photonics technology allows the integration of optical components on a very small scale, the spacing of the optical cores of a multi-core optical fiber determines the distances of the optical connections.

This works well for edge-coupled fibers where all optical waveguides terminate at the edge of the chip at distances matched to the spacing of the optical cores in the multi-core optical fiber. However, the coupling of a multi-core optical fiber with, for example, linearly arranged optical cores in two rows to an optical chip via the edge of the chip has certain disadvantages, since the differences in the size of the structures are quite large. An optical core of a multi-core optical fiber has a diameter of about 10 µm while the waveguide on the chip has a diameter of about 200 nm, which creates a mismatch.

A size conversion of the mode field has to take place as the mode field is confined to the order of 100 nm while an optical core of the optical fiber has a size of about 10 µm. This means that coupling from the optical chip into the optical fiber works well, while the reverse is not true. Matching the mode fields requires a lot of space on the optical chip, negating the advantages of the miniaturization of the Silicon Photonics technology.

An alternative method is the use of grating couplers that are edged into the surface of an optical chip and can be tailored to match the size of an optical core of an optical fiber without sacrificing too much additional space. However, the direct coupling of the face of the optical fiber to the surface of the optical chip requires the fiber to stick out from the surface. The fiber may be bent, for example by 90°, to be guided away from the optical chip and to be connected to a different device or may be bent by an angle of 180° when it is to be attached to another part of the same optical chip.

It is desirable to provide a multi-core optical fiber which allows for a reliable coupling to an optical chip and a space-saving arrangement of the optical fiber when coupling the optical fiber to an optical chip. It is a further desire to provide an optical system which allows for a reliable and space-saving coupling of a multi-core optical fiber to an optical chip. A further concern is to provide a method of manufacturing a multi-core optical fiber which allows for a reliable and space-saving coupling of the optical fiber to an optical chip.

An embodiment of a multi-core optical fiber which enables a reliable coupling to an optical chip and concurrently a space-saving arrangement is defined in present application. According to an embodiment of the multi-core optical fiber, the optical fiber comprises a plurality of optical cores to respectively transmit light, the optical cores extending in the multi-core optical fiber along a longitudinal axis of the multi-core optical fiber and comprising a first optical core and at least a second optical core being different from the first optical core. The multi-core optical fiber further comprises a plurality of cleaves extending from a surface of the multi-core optical fiber into the multi-core optical fiber and comprising a first cleave and at least a second cleave being different from the first cleave. The first cleave comprises a surface, wherein the first optical core ends at the surface of the first cleave. The surface of the first cleave is configured to deflect the light transmitted in the first optical core such that the light is coupled out of the multi-core optical fiber at the surface of the first cleave. The at least one second cleave comprises a surface, wherein the at least one second optical core ends at the surface of the at least one second cleave and wherein the surface of the at least one second cleave is configured to deflect the light transmitted in the at least one second optical core such that the light is coupled out of the multi-core optical fiber at the surface of the at least one second cleave. The first and the at least one second cleave are staggered along the longitudinal axis of the multi-core optical fiber.

An optical system which enables a multi-core optical fiber to be coupled to an optical chip in a reliable and space-saving manner is defined in claim 11. According to an embodiment of the optical system, the system comprises a multi-core optical fiber as described above and an optical chip comprising a substrate and a first optical device and at least a second optical device being respectively disposed on the substrate. The multi-core optical fiber is arranged above the optical chip such that the longitudinal axis of the multi-core optical fiber is arranged in a plane being parallel to a plane of the substrate as far as the end of the multi-core optical fiber. The multi-core optical fiber is arranged above the optical chip such that light coupled out of the first optical core of the multi-core optical fiber is coupled into the first optical device and/or light coupled out of the first optical device is coupled into the first optical core of the multi-core optical fiber. The multi-core optical fiber is arranged above the optical chip such that light coupled out of the at least one second optical core of the multi-core optical fiber is coupled into the at least one second optical device and/or light coupled out of the at least one second optical device is coupled into the at least one second optical core of the multi-core optical fiber.

A method of manufacturing a multi-core optical fiber which allows for a reliable coupling of the fiber to an optical chip and concurrently for a space-saving arrangement of the fiber when coupled to the optical chip is defined in claim 13. According to the method a multi-core optical fiber is provided, wherein the multi-core optical fiber includes a plurality of optical cores to respectively transmit light, wherein the optical cores extend in the multi-core optical fiber along a longitudinal axis of the multi-core optical fiber and wherein the optical fiber comprises a first optical core and at least a second optical core being different from the first optical core. A plurality of cleaves extending from a surface of the multi-core optical fiber into the multi-core optical fiber and comprising a first cleave and at least a second cleave being different from the first cleave are created. The first cleave comprises a surface, wherein the first optical core ends at the surface of the first cleave and wherein the surface of the first cleave is configured to deflect the light transmitted in the first optical core such that the light is coupled out of the multi-core optical fiber at the surface of the first cleave. The at least one second cleave comprises a surface, wherein the at least one second optical core ends at the surface of the at least one second cleave and wherein the surface of the at least one second cleave is configured to deflect the light transmitted in the at least one second optical core such that the light is coupled out of the multi-core optical fiber at the surface of the at least one second cleave. The first and the at least one second cleave are staggered along the direction of the longitudinal axis of the multi-core optical fiber.

The disclosure is also directed to a multi-core optical fiber, comprising a plurality of optical cores extending in the multi-core optical fiber along a longitudinal axis of the multi-core optical fiber and comprising a first optical core and at least a second optical core being different from the first optical core and a cladding where the plurality of optical cores are embedding in the cladding. The multi-core optical fiber further comprises a plurality of cleaves extending from a surface of the multi-core optical fiber into the multi-core optical fiber and comprising a first cleave and at least a second cleave being different from the first cleave. The first cleave comprises a surface, wherein the first optical core ends at the surface of the first cleave. The surface of the first cleave is configured to deflect the light transmitted in the first optical core such that the light is coupled out of the multi-core optical fiber. The at least one second cleave comprises a surface, wherein the at least one second optical core ends at the surface of the at least one second cleave and wherein the surface of the at least one second cleave is configured to deflect the light transmitted in the at least one second optical core such that the light is coupled out of the multi-core optical fiber. The first and the at least one second cleave are staggered along the longitudinal axis of the multi-core optical fiber and the cladding is shaped such that the multi-core optical fiber comprises at least one alignment structure to align the multi-core optical fiber onto a surface.

The disclosure is also directed to a multi-core optical fiber, comprising a plurality of optical cores extending in the multi-core optical fiber along a longitudinal axis of the multi-core optical fiber and comprising a first optical core and at least a second optical core being different from the first optical core wherein the first optical core is disposed in a first array and the second optical core is disposed in a second array. By way of explanation, the first core is disposed in a first linear array as a first row and the second core is disposed in a second linear array as a second row. However, the first and second array may have other arrangement such as non-linear array or the like. The multi-core optical fiber further comprises a plurality of cleaves extending from a surface of the multi-core optical fiber into the multi-core optical fiber and comprising a first cleave and at least a second cleave being different from the first cleave. The first cleave comprises a surface, wherein the first optical core ends at the surface of the first cleave. The surface of the first cleave is configured to deflect the light transmitted in the first optical core such that the light is coupled out of the multi-core optical fiber. The at least one second cleave comprises a surface, wherein the at least one second optical core ends at the surface of the at least one second cleave and wherein the surface of the at least one second cleave is configured to deflect the light transmitted in the at least one second optical core such that the light is coupled out of the multi-core optical fiber. The first and the at least one second cleave are staggered along the longitudinal axis of the multi-core optical fiber.

The disclosure is also directed to a multi-core optical fiber, comprising a plurality of optical cores extending in the multi-core optical fiber along a longitudinal axis of the multi-core optical fiber and comprising a first optical core and at least a second optical core being different from the first optical core. The multi-core optical fiber further comprises a plurality of cleaves extending from a surface of the multi-core optical fiber into the multi-core optical fiber and comprising a first cleave and at least a second cleave being different from the first cleave. The first cleave comprises a surface, wherein the first optical core ends at the surface of the first cleave. The surface of the first cleave is configured to deflect the light transmitted in the first optical core such that the light is coupled out of the multi-core optical fiber. The at least one second cleave comprises a surface, wherein the at least one second optical core ends at the surface of the at least one second cleave and wherein the surface of the at least one second cleave is configured to deflect the light transmitted in the at least one second optical core such that the light is coupled out of the multi-core optical fiber. The first and the at least one second cleave are staggered along the longitudinal axis of the multi-core optical fiber and the first cleave comprises another surface, and the other (e.g., another) surface extends between the surface of the first cleave and the surface of one of the at least one second cleave.

The staggered cleaves or kerfs allow an adjustable spacing of the light spots coupled out of the optical cores of the multi-core optical fiber. This allows an in-plane arrangement of the optical fiber as well as a tailoring of the distances between the coupling sites to the requirements of the optical devices arranged on an optical chip or a printed circuit board. With the method described above only the material directly in front of each core is removed. The material may be removed such that each of the kerfs is provided with a slanted surface in relation to the direction of the optical cores, for example, a 45° angle cleave. The local kerfs are offset with respect to each other in order to allow for the space requirements of the optical devices that the multi-core optical fiber is coupled with for reliable and efficient communication of the optical signals.

It is to be understood that both the foregoing general description and the following detailed description present embodiments and are intended to provide an overview or a framework for understanding the nature and character of the disclosure. The accompanying drawings are included to provide a further understanding, and are incorporated into and constitute a part of this specification. The drawings illustrate various embodiments and, together with the description, serve to explain the principles and operation of the concepts disclosed.

DETAILED DESCRIPTION

Figure 1A:
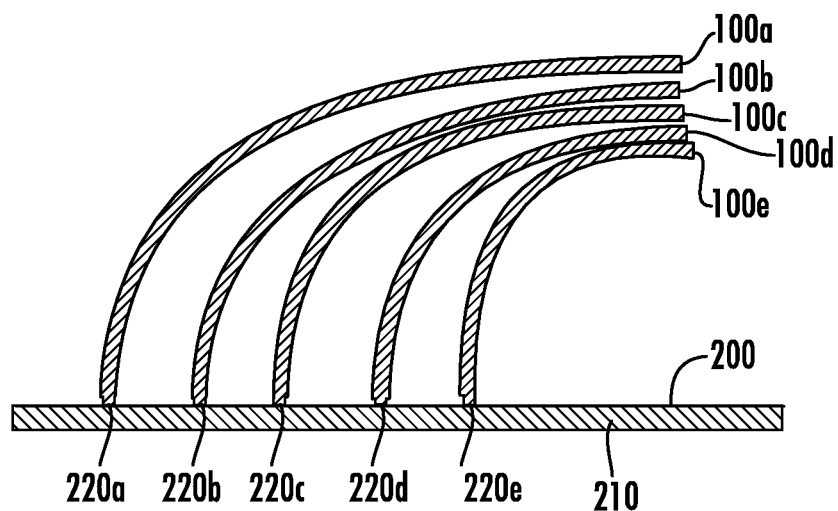
FIG. 1A shows an embodiment of a coupling of a plurality of optical fibers to optical devices of an optical chip.

The Silicon Photonics technology enables the integration of optical devices of a small scale in an optical chip. FIG. 1A shows an optical system comprising optical fibers 100a, . . . , 100e and an optical chip 200 manufactured by the Silicon Photonics technology. Each of the optical fibers comprises an optical core to transmit light. The optical chip 200 comprises optical devices 220a, . . . , 220e which are integrated into a substrate 210 of the optical chip 200. The substrate 210 can contain silicon or III/V-materials as an optical medium for signal transmission. Optical fibers 100a, . . . , 100e are provided to couple light in or out of the optical devices.

If it is desired that the coupling of the optical fibers to the optical devices is not accomplished by attaching the optical fibers to an edge of the optical chip 200, but directly to the optical devices 220a, . . . , 220e, each of the optical fibers has to be attached perpendicular to the surface of the optical chip or to the respective optical device. As a consequence and as shown in FIG. 1A each optical fiber 220a, . . . , 220e protrudes perpendicularly out of the plane of the optical chip 200.

Figure 1B:
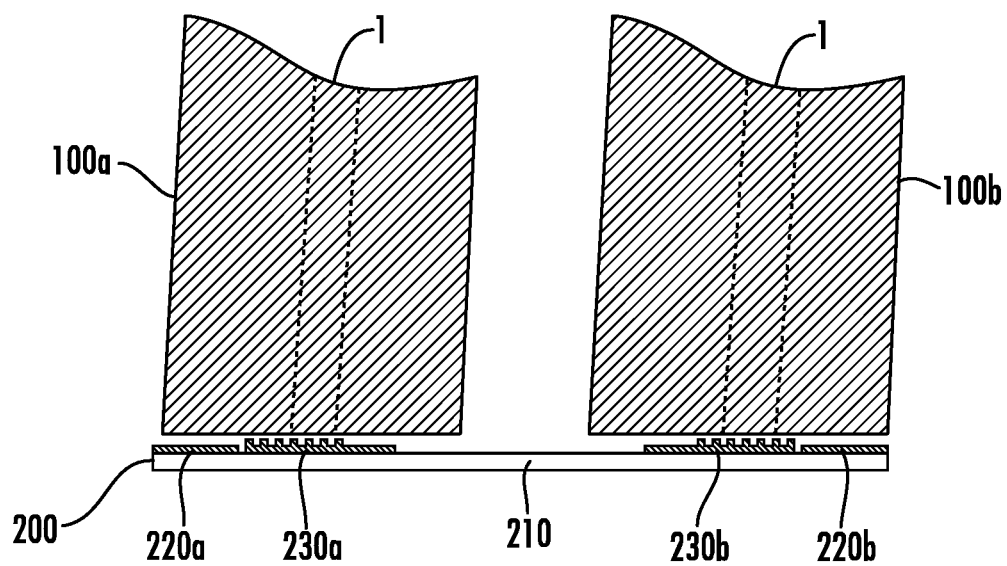
FIG. 1B shows an embodiment of a coupling of optical fibers to optical devices of an optical chip by grating couplers.

FIG. 1B shows the coupling of individual optical fibers 100a, 100b to the optical chip 200 in greater detail. The optical chip 200 which may be made by the Silicon Photonics technology comprises optical devices 220a, 220b which are disposed on or are integrated in the substrate 210. In order to couple light between the optical fibers 100a, 100b and the optical devices 220a, 220b optical couplers 230a, 230b are provided on the surface of the substrate 210. Light may be coupled from optical cores 1, 2 of the optical fibers 100a, 100b to the optical couplers 230a, 230b and from the optical couplers the light is transferred to the optical devices 220a, 220b. The optical couplers may be configured as grating couplers.

The embodiment of the optical system shown in FIGS. 1A and 1B requires that the optical fibers to be connected to the respective optical devices have to be bent by 90° to be guided away from the optical chip to be connected to a different optical chip or by an angle of 180° to be connected to optical devices on the same optical chip. An in-plane arrangement of the optical fibers would be of great advantage as it does not introduce any additional space in the direction perpendicular to the surface of the optical chip and does not introduce any stress in the optical fibers.

Figure 2A:
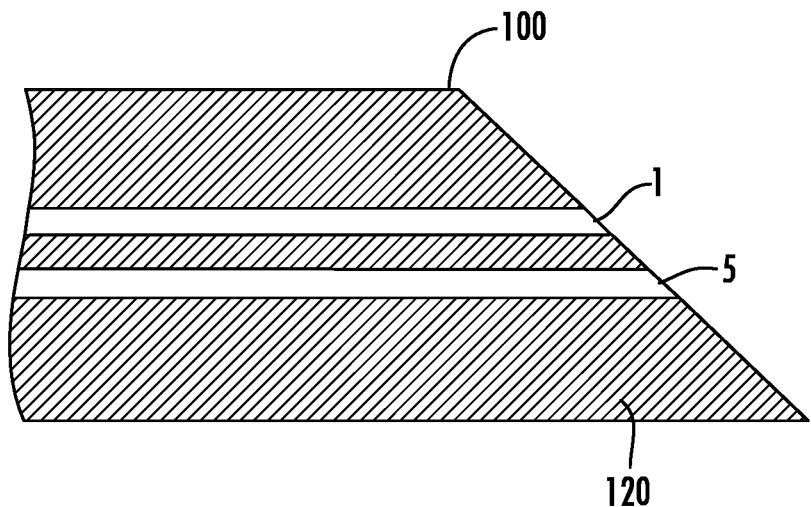
FIG. 2A shows a side view of a schematic structure of a multi-core optical fiber.
Figure 2B:
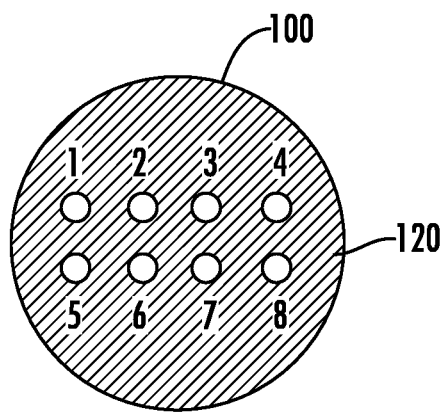
FIG. 2B shows a front view of a schematic structure of a multi-core optical fiber.

Instead of using optical fibers, wherein each of the optical fibers comprises only one optical core as shown in FIGS. 1A and 1B, multi-core optical fibers can be used to provide a space-saving and reliable coupling of the optical chip to the optical fibers for communication with other devices, for example to other optical chips. FIG. 2A shows an explanatory embodiment of a multi-core optical fiber 100 in a side view and FIG. 2B shows a cross-section of the multi-core optical fiber 100. In the embodiment of the multi-core optical fiber shown in FIGS. 2A and 2B a plurality of optical cores 1, . . . , 8 to respectively transmit light are arranged in a cladding 120 of the optical fiber 100. By using a multi-core optical fiber which comprises, for example, eight cores arranged in two rows in the cross-section of the optical fiber, as shown in FIG. 2B, the connection density may be increased eightfold as compared to optical fibers comprising only one optical core. Optical fibers according to the concepts disclosed may have any suitable number of cores with any suitable arrangement.

Figure 3A:
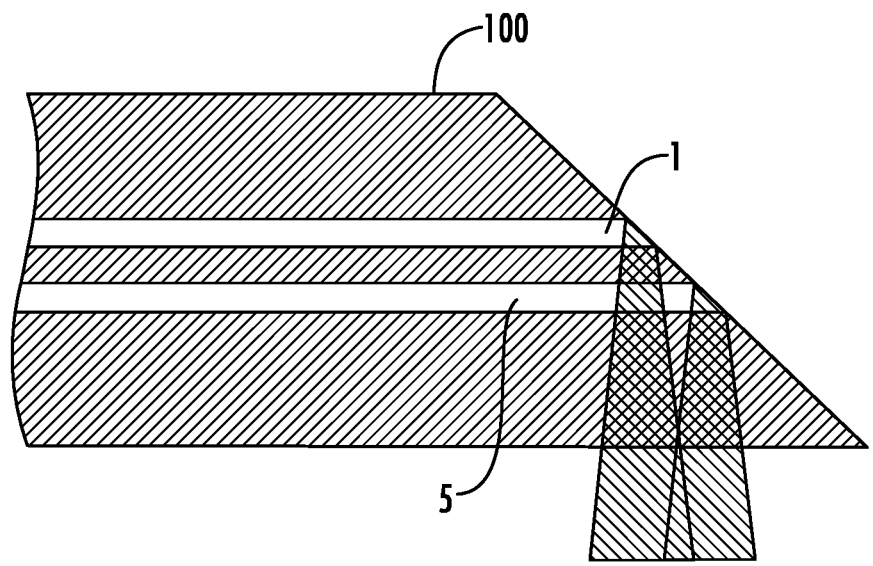
FIG. 3A shows a side view of a multi-core optical fiber during coupling-out of light.
Figure 3B:
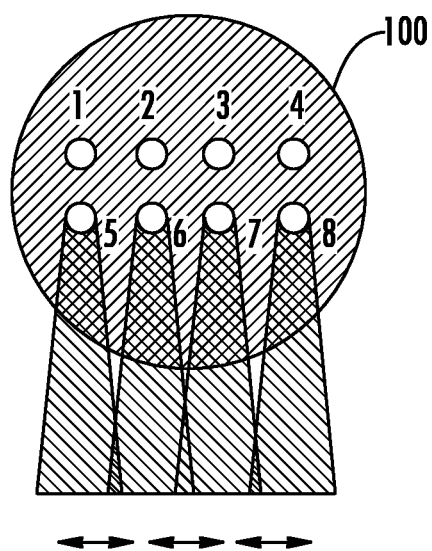
FIG. 3B shows a front view of an embodiment of a multi-core optical fiber during coupling-out of light.

In order to couple the light out of the optical cores of the multi-core optical fiber, the optical fiber may be provided by a cleave, for example, a 45° cleave as shown in FIGS. 2A, 2B and FIGS. 3A, 3B. FIG. 3A shows the optical fiber 100 being cleaved at an end of the optical fiber by a suitable angle such as 45°. Light which is transmitted through the optical cores is deflected/reflected at the slanted surface of the cutting area. FIG. 3B shows rays of light leaving the optical cores 1, 5 arranged above each other. FIG. 3B shows the coupling-out of light rays of optical cores 5, . . . , 8 being arranged in a mutual plane inside the multi-core optical fiber next to each other. In other words, the optical signals overlap and may cause issues with proper communication along with alignment of the device.

As illustrated in FIGS. 3A and 3B the distance between the light rays leaving the individual cores are close together and fixed. As a consequence, by simply providing the multi-core optical fiber with a cutting area it is almost impossible to couple light between different optical cores of a multi-core optical fiber and optical devices of an optical chip. A simple 45° cleave of the multi-core optical fiber would result in a spacing of the light spots on the surface of the optical chip that is too small so that the light spots would influence each other.

FIGS. 4A to 8 show different embodiments of a multi-core optical fiber comprising a plurality of optical cores 1, 2, . . . , 8 to respectively transmit light. The optical cores 1, 2, . . . , 8 extend into the embodiments of the multi-core optical fiber 100 along a longitudinal axis 101 of the optical fiber. The plurality of optical cores comprises a first optical core 1 and at least a second optical core 2, . . . , 8 being different from the first optical core 1. The optical fiber 100 further comprises a plurality of cleaves or kerfs 110a, 110b, . . . , 110h extending from a surface 102 of the optical fiber 100 into the optical fiber and comprising a first cleave or kerf 110a and at least a second cleave or kerf 110b, . . . , 110h being different from the first cleave or kerf 110a.

The first cleave 110a comprises a surface 111a, wherein the optical core 1 ends at the surface 111a of the cleave 110a. The surface 111a of the cleave 110a is configured to deflect the light transmitted in the optical core 1 such that the light is coupled out of the optical fiber 100 at the surface 111a. The cleaves 110b, . . . , 110h comprise a respective surface 111b, . . . , 111h, wherein each of the optical cores 2, . . . , 8 ends at one of the surfaces 111b, . . . , 111h of the cleaves 110, . . . , 110h. The respective surface 111b, . . . , 111h of the cleaves 110b, . . . , 110h is configured to deflect the light transmitted in the optical cores 2, . . . , 8 such that the light is coupled out of the optical fiber 100 at the respective surface 111b, . . . , 111h. The cleaves 110a, . . . , 110h are staggered along the longitudinal axis 101 of the optical fiber 100.

According to the embodiments of the multi-core optical fiber shown in FIGS. 4A to 8 the cleaves 110a, . . . , 110h are arranged with a different distance spaced away from an end 103 of the optical fiber 100. The cleaves 110b, . . . , 110h may be arranged closer to the end 103 of the optical fiber 100 than the cleave 110a.

In order to deflect the light such that the light is coupled out of the respective optical cores, the respective surfaces 111a, . . . , 111h of the cleaves 110a, . . . , 110h may be inclined by an angle between 30° and 60°, for example an angle of 45°, in relation to the direction of the optical cores 1, . . . , 8 of the optical fiber 100. The slant of the surfaces 111a, . . . , 111h relative to the respective optical paths which terminate at the surfaces enables that light transmitted in the respective optical cores 1, . . . , 8 is reflected at the respective inclined surface of the cleaves and coupled out of the optical fiber in a direction which may be nearly perpendicular to the direction of the longitudinal axis 101 of the multi-core optical fiber.

According to the embodiment of the multi-core optical fiber 100 shown in FIGS. 4A to 8 the surfaces 111a, . . . , 111h of the cleaves 110a, . . . , 110h may be shaped such that the light transmitted in the optical cores 1, . . . , 8 is focussed after the deflection or reflection at the surfaces 111a, . . . , 111h in a direction being different from the direction of the longitudinal axis 101 of the optical fiber 100. Additionally, the end-faces/surfaces 111a, . . . , 111h can be shaped to incorporate a beam forming element like a lens to focus the light. Furthermore, the surfaces 111a, . . . , 111h can be fitted with curved or mirrored facets to focus the light onto an optical chip or to increase the reflection coefficient, respectively.

Figure 4A:
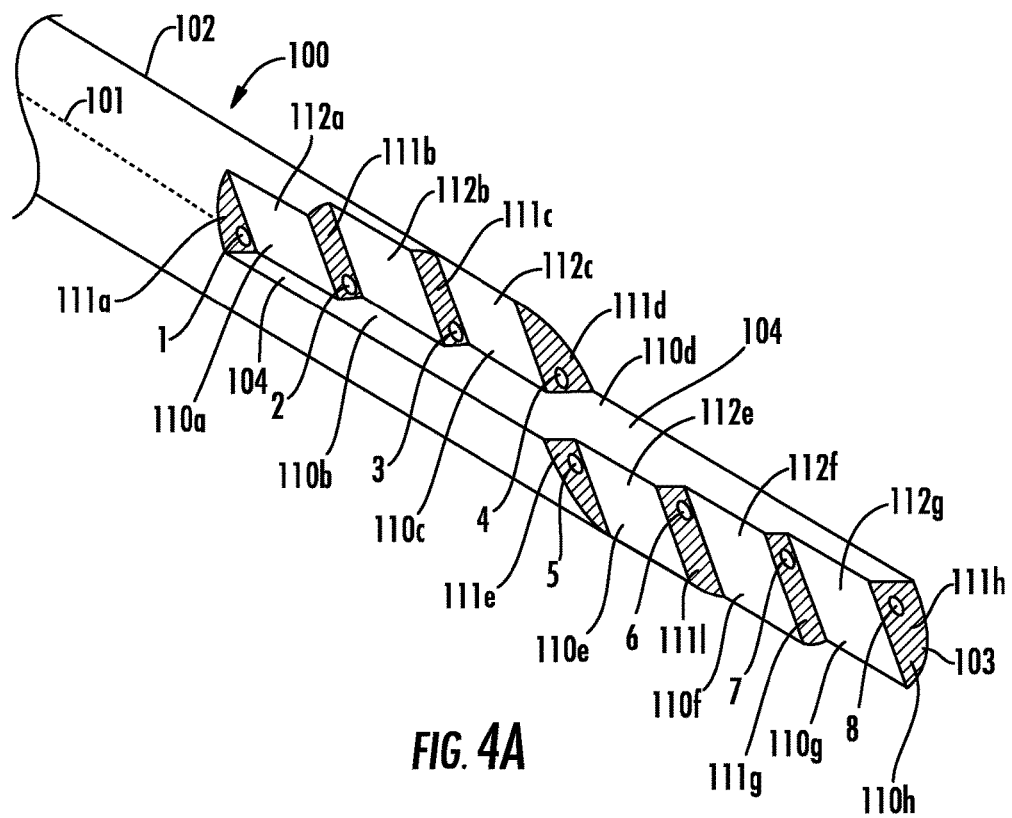
FIG. 4A shows a three-dimensional view of an embodiment of a multi-core optical fiber.

The embodiments of the multi-core optical fibers shown in FIGS. 4A to 8 are explained in the following in detail. FIG. 4A shows a three-dimensional representation of an embodiment of a multi-core optical fiber 100 with staggered cleaves or kerfs 110a, . . . , 110h. The cleaves may be formed in the cladding of the optical fiber as stair-shaped sections which are formed in an upper part and a lower part of the cross-section of the optical fiber 100. The cleaves may be provided in an end section of the multi-core optical fiber along the longitudinal axis 101 of the fiber and may extend to the end 103 of the optical fiber.

The cleaves 110a, 110b and 110c comprise surfaces 111a, 111b, 111c at which a respective one of the optical cores 1, 2, 3 ends. The surfaces 111a, 111b, 111c and 111d extend from the outer surface 102 of the optical fiber in the interior of the optical fiber to the bottom area 104. The cleaves 110a, 110b and 110c further comprises a surface 112a, 112b and 112c. The surface 112a of the cleave 110a extends between the light-deflecting surface 111a of the cleave 110a and the light-deflecting surface 111b of the subsequent cleave 110b. The surface 112b extends between the light-deflecting surface 111b of the cleave 110b and the light-deflecting surface 111c of the subsequent cleave 110c. The surface 112c extends between the light-deflecting surface 111c of the cleave 110c and the light-deflecting surface 111d of the subsequent cleave 110d. The cleaves 110a, . . . , 110d further comprise a bottom area 104 in the middle of the cross-section of the optical fiber 100.

The cleaves 110e, . . . , 110h extending in the lower part of the cross-section of the optical fiber 100 comprise a respective light-deflecting surface 111e, . . . , 111h at which a respective one of the optical cores 5, . . . , 8 of the optical fiber ends. The cleaves 110e, 110f and 110g further comprise a respective surface 112e, 112f and 112g. The surface 112e extends between the light-deflecting surface 111e of the cleave 110e and the light-deflecting surface 111f of the subsequent cleave 110f. The cleave 110f comprises the surface 112f extending between the light-deflecting surface 111f and the light-deflecting surface 111g of the subsequent cleave 110g. The cleave 110g comprises the surface 112g extending between the light-deflecting surface 111g of the cleave 110g and the light-deflecting surface 111h of the cleave 110h. The light-deflecting surfaces 111e, 111f and 111g extend from the outer surface 102 of the optical fiber in the interior of the optical fiber to the bottom area 104.

Figure 4B:
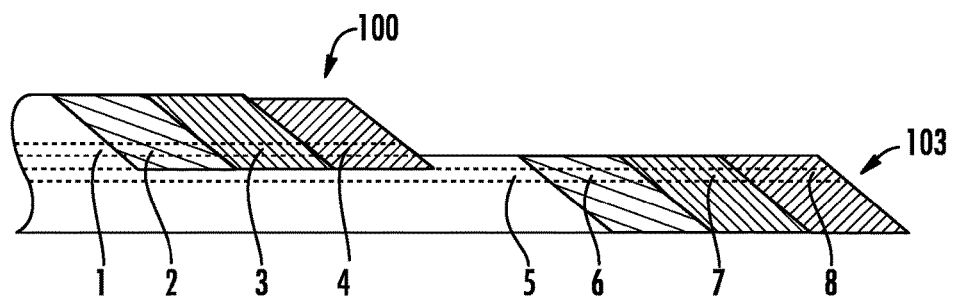
FIG. 4B shows a side view of an embodiment of a multi-core optical fiber.

FIG. 4B shows a side view of the multi-core optical fiber 100 shown in FIG. 4A. The different shades of grey correspond to different depth levels of the cleaves 110a, . . . , 110g. The light-deflecting surfaces 111a, . . . , 111h may be slanted to provide a light-deflecting or light-reflecting area.

Figure 5:
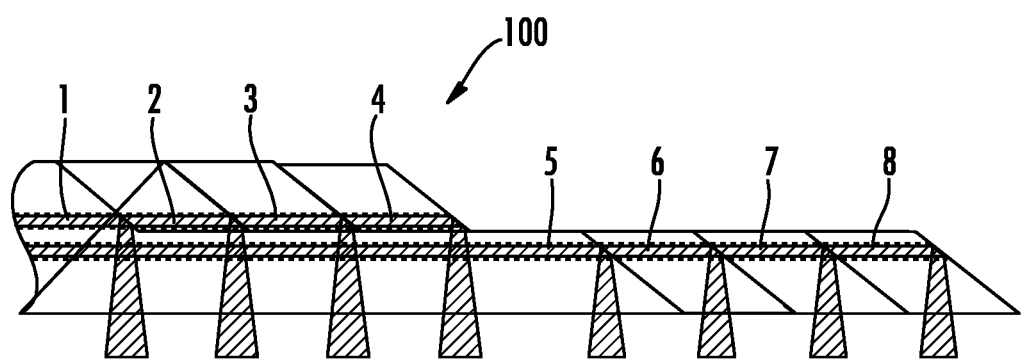
FIG. 5 shows the coupling of light out of an embodiment of a multi-core optical fiber.

FIG. 5 shows the transmission of light along the optical cores 1, . . . , 8 and the coupling-out of the light guided in the optical cores of the inclined surfaces 111a, . . . , 111h. In the embodiment of the multi-core optical fiber shown in FIGS. 4A to 5 the light-deflecting surfaces 111a, . . . , 111h may be slanted at an angle of 45° so that the light transmitted through the optical cores 1, . . . , 8 is coupled out of the optical fiber at the respective slanted surfaces 111a, . . . , 111h in a direction perpendicular to the longitudinal axis 101 of the optical fiber 100. As illustrated in FIG. 5, the distance between the light spots may be adjusted by the offset at which the cleaves 110a, . . . , 110h are formed in the optical fiber. In order to deflect the light spots in a different direction, the angle at which the light-deflecting surfaces are slanted in relation to the direction of the optical cores may be varied. Consequently, the signals carried by the individual cores may be extracted from the multi-core optical fiber in a desired arrangement without overlapping signals and while still allowing a compact footprint.

Figure 6:
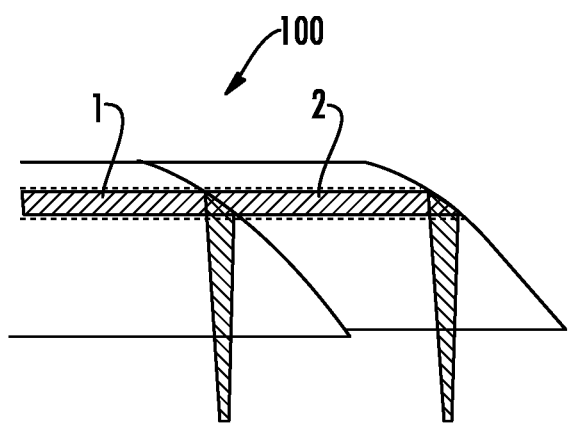
FIG. 6 shows curved surfaces of an embodiment of a multi-core optical fiber.

FIG. 6 shows a cutout of an embodiment of an optical fiber 100 with cleaves 110a, 110b and the respective light-deflecting surfaces 111a, 111b. The light-deflecting surfaces 111a, . . . , 111h may be shaped to incorporate a beam-forming element like a lens to focus the light. In the embodiment of the multi-core optical fiber 100 of FIG. 6, the light-deflecting surfaces 111a, 111b are formed with curved surfaces to focus or collimate the light transmitted in the individual cores 1, 2. Such curved surfaces to incorporate a beam-shaping effect, for example, a focussing effect, can be produced by milling or dry etching from the surface 102 of the multi-core optical fiber.

The thinning of the optical fiber in order to create the staggered cleaves makes the structure at the end of the optical fiber fragile with a high risk of damage to the optical fiber end while the optical fiber is coupled to the optical components of an optical chip. This can be avoided by first attaching the optical fiber to the optical chip and then milling the structure as shown in FIGS. 4A and 4B at the end of the optical fiber. This has the advantage of making the cleaves at the position that the optical components actually are placed on the substrate of the optical chip and not where they are intended to be so that lateral offsets due to manufacturing tolerances in pick-and-place machines are avoided.

Figure 7A:
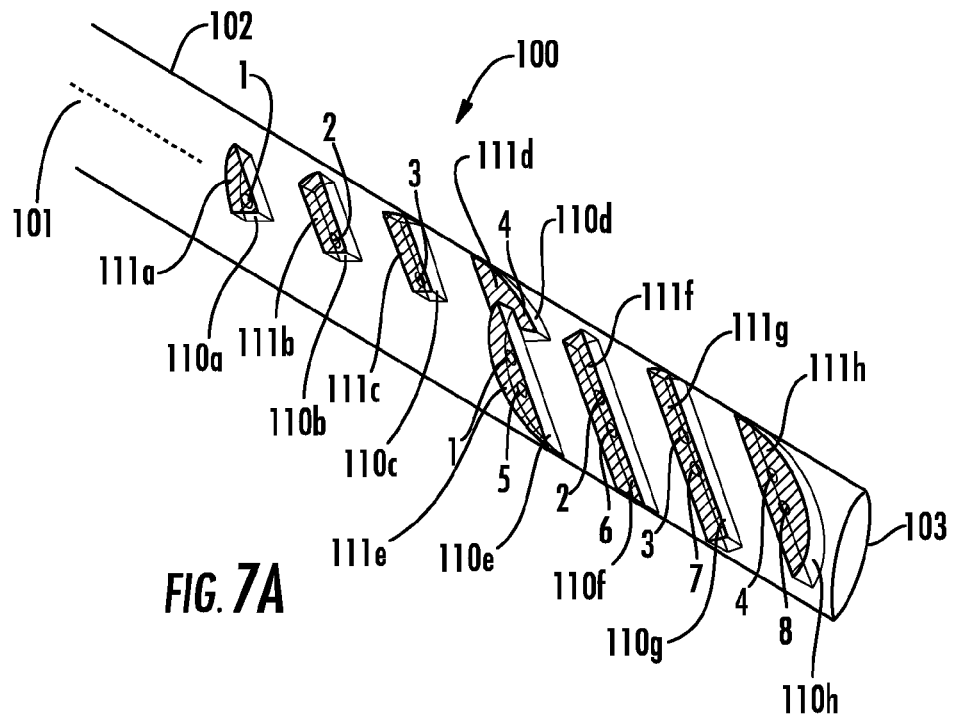
FIG. 7A shows a three-dimensional view of an embodiment of a multi-core optical fiber.

FIG. 7A shows an embodiment of a multi-core optical fiber 100 comprising cleaves 110a, . . . , 110h being arranged in an end section of the optical fiber along the longitudinal axis 101 as far as the end 103 of the optical fiber. The cleaves 110a, . . . , 110h may be formed as a respective hole which extends from the surface 102 of the optical fiber into the interior of the optical fiber. The cleaves 110b, 110c, 110g and 110f may be configured as rectangular holes into the optical fiber. The cleaves 110a, . . . , 110d are arranged in the upper section of the cross-section of the optical fiber and the cleaves 110e, . . . , 110h are arranged in the lower section of the cross-section of the optical fiber. The cleaves extend from the surface 102 of the optical fiber into the interior of the optical fiber until they reach a plane 104 of the optical fiber. The plane 104 may be arranged in the middle of the cross-section of the optical fiber. The cleaves 110a to 110d do not interpenetrate the complete optical fiber. The cleaves 110e to 110h extend between the surface 102 of the optical fiber and thus interpenetrate the complete optical fiber.

The cleaves 110a, . . . , 110d comprise a light-deflecting surface 111a, . . . , 110d on which only one of the respective optical cores 1, . . . , 4 terminates. The cleaves 110e to 110h being arranged between the cleaves 110a, . . . , 110d and the end 103 of the optical fiber comprise a light-deflecting surface 111e, . . . , 111h at which more than one optical core terminates. The cleave 110e is arranged in the prolongation of the cleave 110a which interrupts the optical core 1. The optical core 1 which is interrupted by the cleave 110a and the light-guiding optical core 5 terminate at the surface 111e. The cleave 110f is arranged in the prolongation of the cleave 110b so that, in addition to the light-guiding optical core 6, the optical core 2 which is already interrupted by the cleave 110b terminates on the light-deflecting surface 111f. The cleave 110g is arranged in the prolongation of the cleave 110c. The light-guiding core 7 terminates at the light-deflecting surface 111g and additionally the optical core 3, which is interrupted by the cleave 110c, terminates at the light-deflecting surface 111g. The cleave 110h is arranged in the prolongation of the cleave 110d. The light-guiding optical core 8 and the optical core 4, which is interrupted by the cleave 110d, ends at the light-deflecting surface 111h.

Figure 7B:
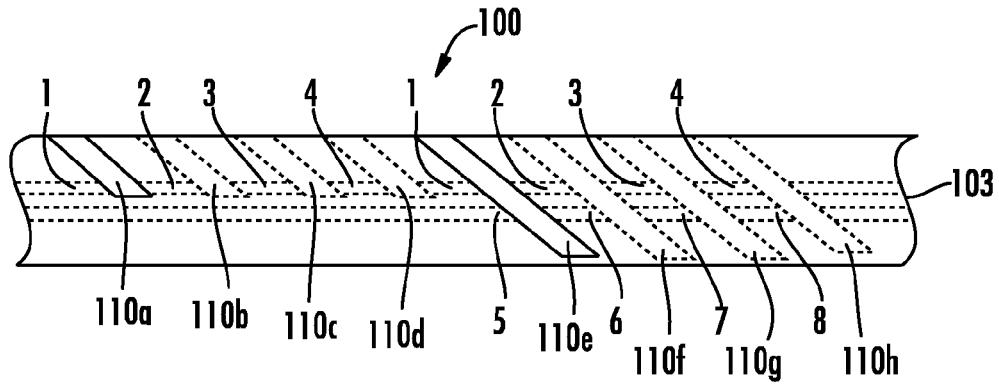
FIG. 7B shows a side view of an embodiment of a multi-core optical fiber.

FIG. 7B shows a side view of the multi-core optical fiber 100 shown in FIG. 7A comprising the cleaves 110a, . . . , 110h. The cleaves are formed as holes being inclined by an angle between 30° to 60°, for example by an angle of 45°, in relation to the direction of the optical cores of the optical fiber. That means that the respective light-deflecting surface 111a, . . . , 111h is also inclined by the angle between 30° to 60°, for example by an angle of 45°, in relation to the direction of the optical cores so as to deflect/reflect the light transmitted in the respective optical core which ends at the respective slanted surface and to couple the light out of the optical fiber. The angled rectangular holes may be drilled into or through the optical fiber to create the deflecting/reflecting surface. Any suitable method may be used for creating the structure for the cleave.

Figure 8:
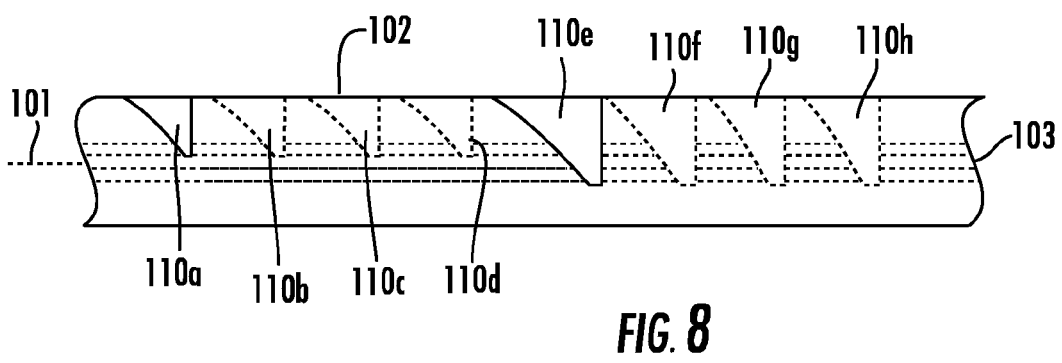
FIG. 8 shows a side view of an embodiment of a multi-core optical fiber.

FIG. 8 shows an embodiment of a multi-core optical fiber in which the cleaves 110a, . . . , 110h are configured in another than the rectangular form, for example in a triangular form. In this embodiment the only critical surface is the light-deflecting surface 111a, . . . , 111h. The other surfaces of the cleaves can be safely ignored. The light-deflecting surfaces 111a, . . . , 111h may be slanted at an appropriate angle in relation to the optical cores to deflect the light transmitted in the optical cores out of the optical fiber.

The preparation of the optical fiber to provide the cleaves 110a, . . . , 110h in the cladding of the optical fiber can be performed by laser drilling or dry etching under the desired angle provided for the light-deflecting surface 111a, . . . , 111h. Both methods allow milling to a precise depth through fine-tuning of the process parameters. The fiber milling can be performed by using a $CO_2$-laser, a titan-sapphire-laser or an Excimer-laser that are able to precisely remove material of the cladding with a precision of a few microns. Also, smooth edges and cleaves can be manufactured with Excimer-lasers. The fiber end section could be detected with a high precision camera system and subsequently milled to the desired shape with a laser with feedback from the camera system or other device if desired.

Figure 9A:
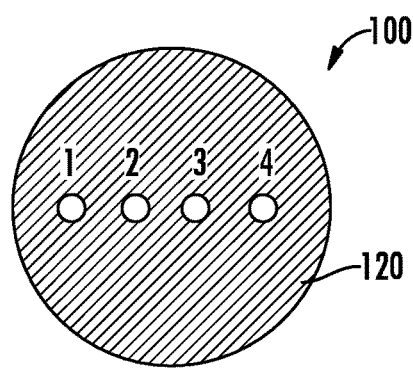
FIGS. 9A to 9D show different arrangements of optical cores of an embodiment of a multi-core optical fiber.
Figure 9B:
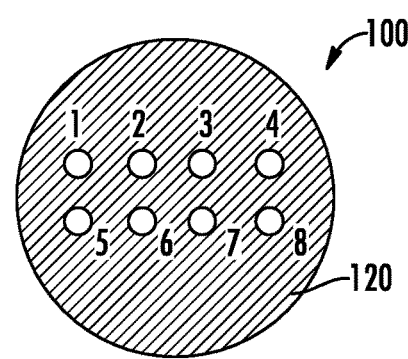
Figure 9C:
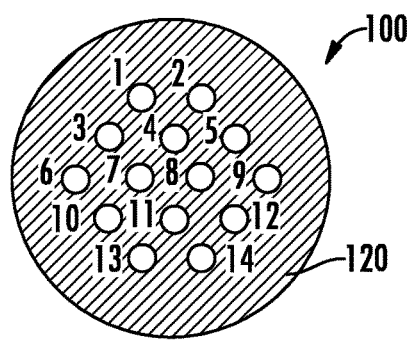
Figure 9D:
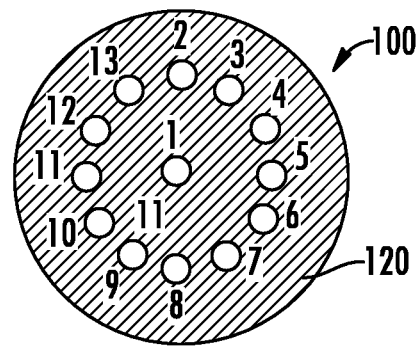

In FIGS. 9A to 9D different arrangements of the optical cores in a multi-core optical fiber 100 are shown. The optical cores are embedded in a cladding 120 of the optical fiber 100 in different formations. FIG. 9A shows a linear 1×4 arrangement of the optical cores 1, . . . , 4 which are arranged next to each other in a mutual plane in the interior of the optical fiber. FIG. 9B shows a linear 2×4 arrangement of optical cores 1, . . . , 8 which are arranged in two planes being disposed in parallel above each other in the interior of the optical cable. FIG. 9C shows a hexagonal arrangement of the optical cores 1, . . . , 14 and FIG. 9D shows a circular arrangement of the optical cores 1, . . . , 13, wherein the optical cores 2, . . . , 13 are arranged around the optical core 1 which is arranged in the centre of the optical fiber.

The optical fiber 100 shown in FIGS. 4A to 8 comprises the optical fibers in a linear 2×4 arrangement as shown in FIG. 9B. However, the structure of the optical fiber 100 as shown in the FIGS. 4A to 8 may also be provided with alternative arrangements of the optical cores, for example the linear 1×4 arrangement shown in FIG. 9A or the hexagonal or circular arrangements shown in FIGS. 9C and 9D. The use of other geometries of multi-core optical fibers with different numbers of cores and arrangements is also possible.

Figure 10A:
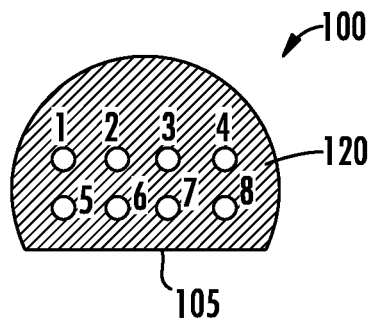
FIGS. 10A to 10D show different embodiments of alignment structures of an embodiment of a multi-core optical fiber.

FIGS. 10A to 10D show different embodiments of the multi-core optical fiber 100 having respective alignment structures 105, . . . , 108 which are created by an appropriate shaping of the cladding 120 of the optical fiber. FIG. 10A shows an embodiment of the optical fiber 100, wherein the circular cross-section of the optical fiber is flattened to provide an alignment structure 105 formed as a flat bottom surface 105. A round outer surface of the cladding at the bottom of the optical fiber usually causes unwanted distortion of the optical beams when light is coupled out of the optical fiber.

According to the embodiment of the optical fiber shown in FIG. 10A the bottom surface of the optical fiber is flattened, for example by laser machining. The flat bottom surface can eliminate the distortion of the light coupled out of the optical fiber and may also provide a mechanical reference surface (datum) to passively align the fiber down onto an optical chip. The flat surface establishes the vertical position of the optical fiber relative to the optical chip. It also establishes a proper angular orientation along the optical fiber and perpendicular to the optical fiber.

Figure 10B:
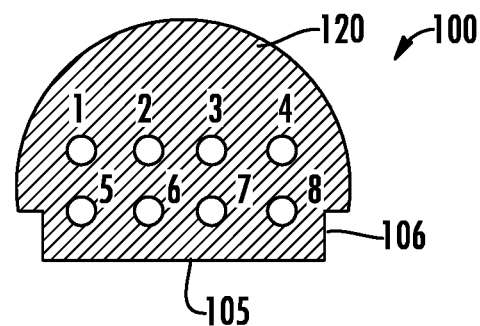
Figure 10C:
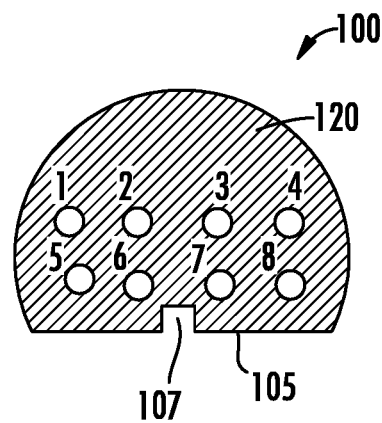
Figure 10D:
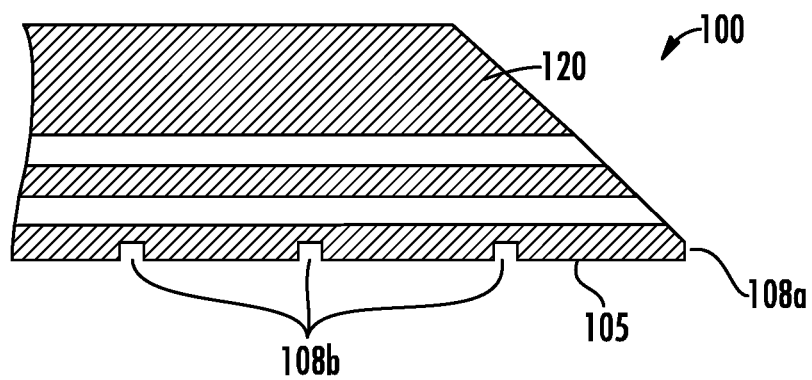

As shown in FIG. 10A the proper lateral position and angular orientation of the optical fiber can be established by using the existing sides of the optical fiber. If the sides of the optical fiber are too high above a mating surface, another set of alignment features can be provided, for example, by milling appropriate structures into the lateral edges of the flat bottom surface of the fiber to create a reference surface in relation to the proper lateral position and angular orientation. These edge datums can mate up against analogous datums on the surface of the optical chip. As a possible example, FIG. 10B shows a cross-section of the optical fiber 100 with a flattened surface 105 and notches 106 at the lateral edges as possible alignment structures. Another possible alignment structure is illustrated in FIG. 10C which shows the flattened surface 105 comprising a slot 107 as alignment structure, wherein the slot 107 may extends along the direction of the longitudinal axis 101 of the optical fiber.

The optical fiber may further comprise appropriate alignment structures in order to align the optical fiber on a surface of an optical chip in relation to the longitudinal direction of the optical fiber. According to the embodiment of the optical fiber shown in FIG. 10D, the optical fiber is provided with a flattened end face 108a and/or with slots 108b extending at the bottom surface, for example, the flattened surface 105 of the optical fiber in a direction perpendicular to the direction of the longitudinal axis 101 of the optical fiber 100.

Figure 11:
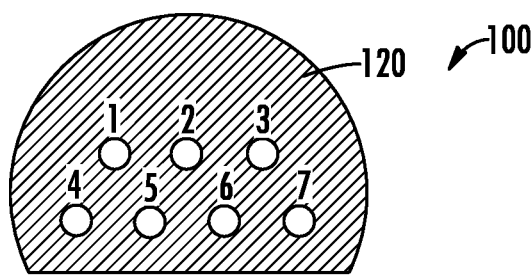
FIG. 11 shows an arrangement of optical cores of an embodiment of a multi-core optical fiber.

FIG. 11 shows an embodiment of a multi-core optical fiber 100 in which a first portion of optical cores 1, 2, 3 and a second portion of optical cores 4, . . . , 7 are arranged in different planes above each other. The optical cores 1, . . . , 7 are arranged such that the optical cores 1, . . . , 7 are embedded in the coating 120 by an offset in a direction perpendicular to the direction of the longitudinal axis of the optical fiber 100 so that no two optical cores of different planes are positioned directly above each other. The core geometry shown in FIG. 11 enables mutual influence of the optical path to be avoided when light is coupled out of the optical cores.

Figure 12A:
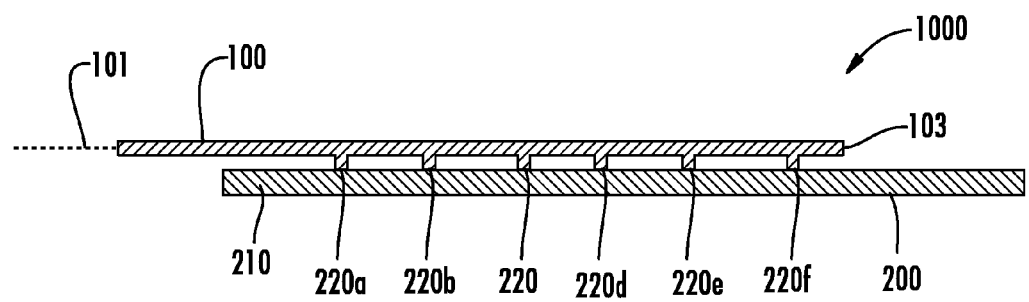
FIG. 12A shows an embodiment of a coupling of a multi-core optical fiber to an optical chip.
Figure 12B:
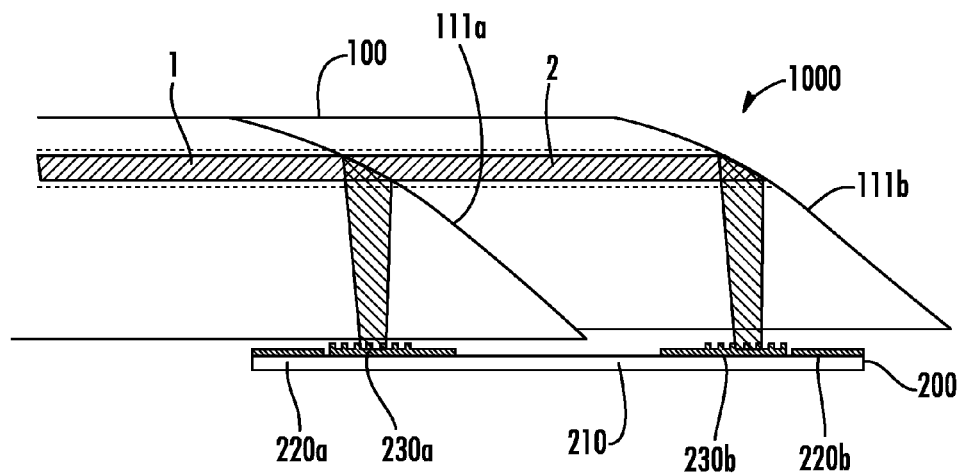
FIG. 12B shows an embodiment of a coupling of a multi-core optical fiber to an optical chip by to grating couplers.

FIGS. 12A and 12B show the coupling of the multi-core optical fiber 100 to optical devices 220a, . . . , 220f arranged in/on a substrate 210 of an optical chip 200, thereby forming coupling assembly 1000. The optical chip 200 may be manufactured by the Silicon Photonics technology. The optical devices may be configured as, for example, VCSELs or photodiodes. In contrast to the coupling of the optical fibers shown in FIGS. 1A and 1B, the multi-core optical fiber 100 may be arranged above the optical chip 200 such that the longitudinal axis 101 of the optical fiber 100 is arranged in a plane being parallel to a plane of the substrate 210 of the optical chip as far as the end 103 of the optical fiber 100. The optical fiber 100 may be directly attached to the substrate 210.

FIG. 12B shows the in-plane coupling of the multi-core optical fiber 100 to the optical devices 220a, 220b in greater detail. The optical chip 200 comprises the optical devices 220a, 220b which are integrated in the optical chip 200, for example in the substrate 210. A coupling device 230a and 230b is provided to couple light between the optical cores 1, 2 of the optical fiber 100 and the optical devices 220a, 220b.

The multi-core optical fiber 100 is arranged parallel to the plane of the optical chip 200 such that the light-deflecting surface 111a of the cleave 110a is disposed above the optical coupler 230a and the light-deflecting surface 111b is disposed above the optical coupler 230b. As shown in FIG. 12B, light transferred through the optical core 1 is deflected, for example, reflected at the light-deflecting/light-reflecting surface 111a, coupled out of the optical fiber 100 at the bottom surface of the optical fiber and coupled in the optical coupler 230a which is connected to the optical device 230a. Light which is transferred in the optical core 2 is deflected, for example, reflected at the light-deflecting/light-reflecting surface 111b, coupled out of the optical fiber 100 at the bottom surface of the optical fiber and coupled in the optical coupler 230b which is connected to the optical device 220b. The optical couplers 230a and 230b may be configured as grating couplers.

The multi-core optical fiber 100 may be used not only for being coupled to an optical chip made by the Silicon Photonics technology, but in combination which each arbitrary optoelectronic chip, for example, an optoelectronic transceiver or receiver chip. The embodiments of the multi-core optical fiber 100 shown in FIGS. 4A to 8 allow an adjustable spacing of the light spots coupled out from the different optical cores 1, . . . , 8 at the light-deflecting surfaces 111a, . . . , 111h. This allows an in-plane arrangement of the multi-core optical fiber 100 as well as a tailoring of the distances between the coupling sides to the requirements of the optical devices arranged on an optical chip or a printed circuit board.

Many modifications and other embodiments set forth herein will come to mind to one skilled in the art to which the embodiments pertain having the benefit of the teachings presented in the foregoing descriptions and the associated drawings. Therefore, it is to be understood that the description and the claims are not to be limited to the specific embodiments disclosed and that modifications and other embodiments are intended to be included within the scope of the appended claims. It is intended that embodiments cover the modifications and variations of the embodiments provided they come within the scope of the appended claims and their equivalents. Although specific terms are employed herein, they are used in a generic and descriptive sense only and not for purposes of limitation.

What is claimed is:

1. A multi-core optical fiber, comprising:
   a plurality of optical cores extending in the multi-core optical fiber along a longitudinal axis of the multi-core optical fiber and comprising a first optical core and at least a second optical core being different from the first optical core;

a plurality of cleaves extending from a surface of the multi-core optical fiber into the multi-core optical fiber and comprising a first cleave and at least a second cleave being different from the first cleave;

wherein the first cleave comprises a surface, wherein the first optical core ends at the surface of the first cleave, and the surface of the first cleave is configured to deflect the light transmitted in the first optical core such that the light is coupled out of the multi-core optical fiber at the surface of the first cleave; and wherein the at least one second cleave comprises a surface, wherein the at least one second optical core ends at the surface of the at least one second cleave, wherein the surface of the at least one second cleave is configured to deflect the light transmitted in the at least one second optical core such that the light is coupled out of the multi-core optical fiber at the surface of the at least one second cleave, and the first and the at least one second cleave are staggered along the longitudinal axis of the multi-core optical fiber.

2. The multi-core optical fiber as claimed in claim 1, wherein the first and the at least one second cleave are arranged with a different distance spaced away from an end of the multi-core optical fiber.

3. The multi-core optical fiber as claimed in claim 2, wherein the at least one second cleave is arranged closer to the end of the multi-core optical fiber than the first cleave, wherein the first core ends at the surface of at least one of the at least one second cleave.

4. The multi-core optical fiber as claimed in claim 1, wherein the respective surface of the first cleave and the at least one second cleave is inclined by an angle between 30° and 60° in relation to the direction of the optical cores of the multi-core optical fiber.

5. The multi-core optical fiber as claimed in claim 1, wherein the surface of the first cleave is shaped such that the light transmitted in the first optical core is focused after the deflection at the surface of the first cleave in a direction being different from the direction of the longitudinal axis of the multi-core optical fiber, wherein the surface of the at least one second cleave is shaped such that the light transmitted in the at least one second optical core is focused after the deflection at the surface of the at least one second cleave in the direction being different from the direction of the longitudinal axis of the multi-core optical fiber.

6. The multi-core optical fiber as claimed in claim 1, wherein the first cleave comprises another surface, and the other surface extends between the surface of the first cleave and the surface of one of the at least one second cleave.

7. The multi-core optical fiber as claimed in claim 1, wherein the first cleave is configured as a hole extending from the surface of the multi-core optical fiber to a plane in the interior of the multi-core optical fiber, and the at least one second cleave is configured as a hole extending from the surface of the multi-core optical fiber completely through the multi-core optical fiber.

8. The multi-core optical fiber as claimed in claim 1, comprising:

a cladding, and the plurality of optical cores are embedded in the cladding in one of a linear, circular or hexagonal arrangement.

9. The multi-core optical fiber as claimed in claim 8, wherein the first and the at least one second optical core are embedded in the cladding in at least two planes being arranged above each other, and the first and the at least one second optical core are arranged within the at least two planes by an offset to each other in a direction being perpendicular to the direction of the longitudinal axis of the multi-core optical fiber.

10. The multi-core optical fiber as claimed in claim 8, wherein the cladding is shaped such that the multi-core optical fiber comprises at least one alignment structure to align the multi-core optical fiber onto a surface of an optical chip.

11. An optical system, comprising:
an multi-core optical fiber as claimed in claim 1,
an optical chip comprising a substrate and a first optical device and at least a second optical device being respectively disposed on the substrate,
wherein the multi-core optical fiber is arranged above the optical chip such that the longitudinal axis of the multi-core optical fiber is arranged in a plane being parallel to a plane of the substrate as far as the end of the multi-core optical fiber,
wherein the multi-core optical fiber is arranged above the optical chip such that light coupled out of the first optical core of the multi-core optical fiber is coupled into the first optical device and/or light coupled out of the first optical device is coupled into the first optical core of the multi-core optical fiber,
wherein the multi-core optical fiber is arranged above the optical chip such that light coupled out of the at least one second optical core of the multi-core optical fiber is coupled into the at least one second optical device and/or light coupled out of the at least one second optical device is coupled into the at least one second optical core of the multi-core optical fiber.

12. The optical system as claimed in claim 11, wherein the multi-core optical fiber is directly attached to the substrate of the optical chip,
wherein the first and the at least one second optical device are configured as devices made by the Silicon Photonic technology and are embedded in the substrate.

13. A method to manufacture a multi-core optical fiber, comprising:
providing a multi-core optical fiber including a plurality of optical cores to respectively transmit light, the optical cores extending in the multi-core optical fiber along a longitudinal axis of the multi-core optical fiber and comprising a first optical core and at least a second optical core being different from the first optical core;
creating a plurality of cleaves extending from a surface of the multi-core optical fiber into the multi-core optical fiber and comprising a first cleave and at least a second cleave being different from the first cleave;
wherein the first cleave comprises a surface, wherein the first optical core ends at the surface of the first cleave, wherein the surface of the first cleave is configured to deflect the light transmitted in the first optical core such that the light is coupled out of the multi-core optical fiber at the surface of the first cleave;
wherein the at least one second cleave comprises a surface, wherein the at least one second optical core ends at the surface of the at least one second cleave, wherein the surface of the at least one second cleave is configured to deflect the light transmitted in the at least one second optical core such that the light is coupled out of the multi-core optical fiber at the surface of the at least one second cleave; and wherein the first and the at least one second cleave are staggered along the direction of the longitudinal axis (101) of the multi-core optical fiber.

14. The multi-core optical fiber as claimed in claim 13, comprising: creating the first and the at least one second cleave with a different distance spaced away from an end of the multi-core optical fiber by one of a laser milling and dry etching process.

15. The multi-core optical fiber as claimed in claim 14, comprising: performing the laser milling process by using at least one of a $CO_2$-laser and a titan-sapphire-laser and an Excimer-laser.

16. A multi-core optical fiber, comprising:
a plurality of optical cores extending in the multi-core optical fiber along a longitudinal axis of the multi-core optical fiber and comprising a first optical core and at least a second optical core being different from the first optical core;
a cladding, and the plurality of optical cores are embedded in the cladding;
a plurality of cleaves extending from a surface of the multi-core optical fiber into the multi-core optical fiber and comprising a first cleave and at least a second cleave being different from the first cleave;
wherein the first cleave comprises a surface, wherein the first optical core ends at the surface of the first cleave, and the surface of the first cleave is configured to deflect the light transmitted in the first optical core such that the light is coupled out of the multi-core optical fiber; and
wherein the at least one second cleave comprises a surface, wherein the at least one second optical core ends at the surface of the at least one second cleave, wherein the surface of the at least one second cleave is configured to deflect the light transmitted in the at least one second optical core such that the light is coupled out of the multi-core optical fiber, and the first and the at least one second cleave are staggered along the longitudinal axis of the multi-core optical fiber, and wherein the cladding is shaped such that the multi-core optical fiber comprises at least one alignment structure to align the multi-core optical fiber onto a surface.

17. The multi-core optical fiber as claimed in claim 16, wherein the first and the at least one second cleave are arranged with a different distance spaced away from an end of the multi-core optical fiber.

18. The multi-core optical fiber as claimed in claim 17, wherein the at least one second cleave is arranged closer to the end of the multi-core optical fiber than the first cleave, wherein the first core ends at the surface of at least one of the at least one second cleave.

19. The multi-core optical fiber as claimed in claim 16, wherein the surface of the first cleave is shaped such that the light transmitted in the first optical core is focused after the deflection at the surface of the first cleave in a direction being different from the direction of the longitudinal axis of the multi-core optical fiber, wherein the surface of the at least one second cleave is shaped such that the light transmitted in the at least one second optical core is focused after the deflection at the surface of the at least one second cleave in the direction being different from the direction of the longitudinal axis of the multi-core optical fiber.

20. A multi-core optical fiber, comprising:
a plurality of optical cores extending in the multi-core optical fiber along a longitudinal axis of the multi-core optical fiber and comprising a first optical core and at least a second optical core being different from the first optical core, wherein the first optical core is disposed in a first array and the second optical core is disposed in a second array;
a plurality of cleaves extending from a surface of the multi-core optical fiber into the multi-core optical fiber and comprising a first cleave and at least a second cleave being different from the first cleave;
wherein the first cleave comprises a surface, wherein the first optical core ends at the surface of the first cleave, and the surface of the first cleave is configured to deflect the light transmitted in the first optical core such that the light is coupled out of the multi-core optical fiber; and
wherein the at least one second cleave comprises a surface, wherein the at least one second optical core ends at the surface of the at least one second cleave, wherein the surface of the at least one second cleave is configured to deflect the light transmitted in the at least one second optical core such that the light is coupled out of the multi-core optical fiber, and the first and the at least one second cleave are staggered along the longitudinal axis of the multi-core optical fiber.

21. The multi-core optical fiber as claimed in claim 20, wherein the cladding is shaped such that the multi-core optical fiber comprises at least one alignment structure to align the multi-core optical fiber onto a surface of an optical chip.

22. A multi-core optical fiber, comprising:
a plurality of optical cores extending in the multi-core optical fiber along a longitudinal axis of the multi-core optical fiber and comprising a first optical core and at least a second optical core being different from the first optical core;
a plurality of cleaves extending from a surface of the multi-core optical fiber into the multi-core optical fiber and comprising a first cleave and at least a second cleave being different from the first cleave;
wherein the first cleave comprises a surface, wherein the first optical core ends at the surface of the first cleave, and the surface of the first cleave is configured to deflect the light transmitted in the first optical core such that the light is coupled out of the multi-core optical fiber; and
wherein the at least one second cleave comprises a surface, wherein the at least one second optical core ends at the surface of the at least one second cleave, wherein the surface of the at least one second cleave is configured to deflect the light transmitted in the at least one second optical core such that the light is coupled out of the multi-core optical fiber, and the first and the at least one second cleave are staggered along the longitudinal axis of the multi-core optical fiber and the first cleave comprises another surface, and the other surface extends between the surface of the first cleave and the surface of one of the at least one second cleave.

23. The multi-core optical fiber as claimed in claim 22, wherein the cladding is shaped such that the multi-core optical fiber comprises at least one alignment structure to align the multi-core optical fiber onto a surface of an optical chip.

* * * * *